W. W. Andrews,
Belay Cleat for Vessels.
No. 36,696. Patented Oct. 21, 1862.
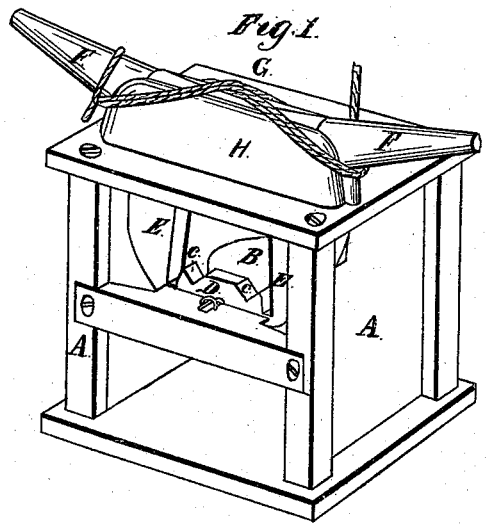
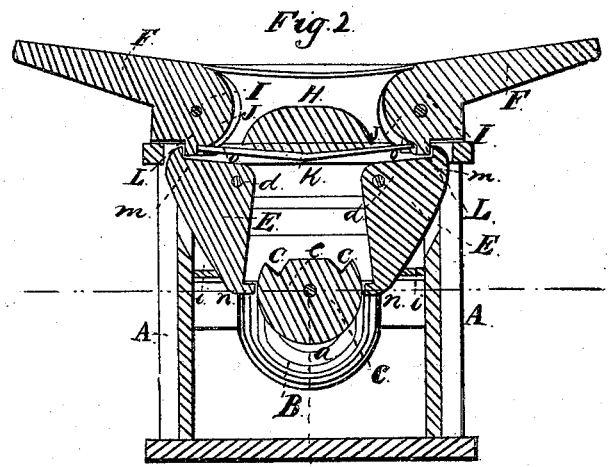
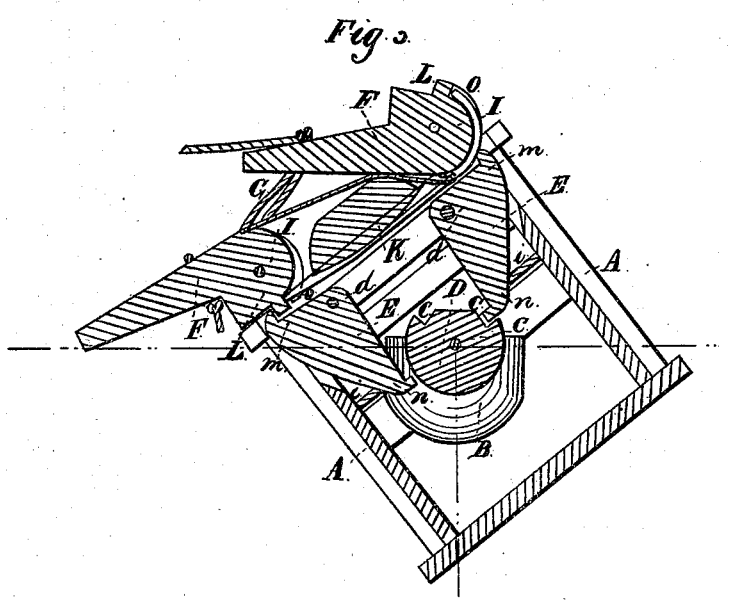
Witnesses
W. H. Burridge
D. Baird
Inventor
W. W. Andrews

UNITED STATES PATENT OFFICE.

W. W. ANDREWS, OF WARRENSVILLE, OHIO.

IMPROVED BELAY-CLEAT FOR BOATS.

Specification forming part of Letters Patent No. 36,696, dated October 21, 1862.

*To all whom it may concern:*

Be it known that I, W. W. ANDREWS, of Warrensville, in the county of Cuyahoga and State of Ohio, have invented new and useful Improvements in Belay-Cleats; and I do hereby declare that the following is a full and complete description of the construction of the same, reference being had to the accompanying drawings, making part of this specification, in which—

Figure 1 is a perspective view. Fig. 2 is a vertical section of Fig. 1, and Fig. 3 is a vertical in position to cast off the lines when the vessel to which it is attached careens.

The nature of my invention relates to such a construction of belay cleats or pins that when the vessel is steady all is "taut," but when the vessel careens, the line goes by the run, and the vessel rights.

A suitable frame-work, A, is attached to the guards, to the mast, or to the deck of the vessel in any convenient and substantial manner. A pendulated weight, B, is suspended about the middle portion of the frame, upon a shaft, C, which shaft must lie in a line parallel with the keel of the vessel and at right angles to the beam. Upon one end of the shaft C, and close to the pendulated weight, B, is secured the cam D, whose semicircular face $a$ is concentric with the shaft C. Above the horizontal diameter of the cam D the concentric surface $a$ is interrupted by the notches $c\ c$, for the purpose hereinafter described.

E E represent clutches of a triangular form, attached at their inner angle to the frame A by bolts $d$. The pendulant ends $n$ of these clutches ordinarily rest against the surface $a$ of the cam C. The lower end of each clutch is gently drawn away from the cam by an elastic spring, $i$.

F F represent the cleats or pins, around which the line or rope is made fast, as seen at G, Fig. 1. These cleats F are pivoted to supporting-blocks H by means of bolts I, which pass through the head of the pins or cleats. These heads J J are cam-shaped or rounding, the middle portion having a depression for the purpose of receiving an elastic band or spring, K, which is secured by its ends to the under side of the cam-head J, as seen at $o\ o$.

Upon the under side of the cam-heads J is a nib or projection, L, against which the end $m$ of the clutches E press, holding the cleats or pins F in the position seen in Figs. 1 and 2 at all times during the ordinary motion of the vessel, while under sail; but if, by any sudden flaw of wind or a squall, the vessel, by means of carrying too much sail, should be suddenly thrown upon her beam ends or careen to a dangerous degree, the pendulated weight B, obeying the law of gravity, moves around on its axis, carrying with it the cam D, until the end $n$ of the clutch is forced or falls into the notch $c$ by the pressure of the nib L on the upper end of the clutch E, which forces back the upper end of the clutch, releasing the cleat or pin F, and the line or rope is cast off from the cleat or pin, as seen in Fig. 3; but the instant the rope is clear from the cleat F, the elastic spring K brings back the cleat to its original position, and the elastic spring $i$ draws the lower end of the clutch out of the notch $c$, the sails go by the run, and the vessel recovers her normal position. All the parts of the belay-cleat assume their original position also. It makes no difference to which side the vessel turns, one or the other of the pins will cast off the line.

This belay-cleat can be varied in form so as to have the pins F F stand in a vertical or inclined position, if desired.

I am aware that self-acting belay-pins have been before devised. I therefore do not claim, broadly, such a device; but What I do claim as my improvement, and desire to secure by Letters Patent, is—

The special arrangement of the pendulated weight B, cam D, and clutches E, in combination with the pins F and springs K, the several parts being arranged substantially as and for the purpose set forth.

W. W. ANDREWS.

Witnesses:
W. H. BURRIDGE,
D. BAIRD.